US006616998B2

(12) United States Patent
Greer et al.

(10) Patent No.: US 6,616,998 B2
(45) Date of Patent: Sep. 9, 2003

(54) POLYESTER PACKAGING FILMS PRODUCING A PEELABLE SEAL

(75) Inventors: Kathleen Diane Greer, Kingsport, TN (US); James Edward Rhein, Jonesborough, TN (US); Hubertus Jacobus Wilhelmus Moolenaar, Dordrecht (NL); Scott Ellery George, Kingsport, TN (US); Richard Leon McConnell, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/824,290

(22) Filed: Apr. 2, 2001

(65) Prior Publication Data

US 2001/0012557 A1 Aug. 9, 2001

Related U.S. Application Data

(62) Division of application No. 09/243,317, filed on Feb. 2, 1999, now abandoned.

(51) Int. Cl.[7] .......................... B32B 27/08; B32B 27/18; B32B 27/30; B32B 27/36
(52) U.S. Cl. ..................... 428/36.6; 428/35.7; 428/213; 428/214; 428/215; 428/343; 428/346; 428/347; 428/349; 428/355 EN; 428/355 AC; 428/480; 428/483; 525/437; 525/447; 525/449; 525/450; 525/451
(58) Field of Search ................................. 428/480, 483, 428/213, 214, 215, 216, 35.7, 36.6, 343, 346, 347, 349, 355 AS, 355 EN, 449; 525/165, 173, 174, 176, 437, 447, 450, 451

(56) References Cited

U.S. PATENT DOCUMENTS

| | | | |
|---|---|---|---|
| 4,125,985 A | 11/1978 | Laske | |
| 4,224,379 A | 9/1980 | Ichinose et al. | |
| 4,269,321 A | 5/1981 | Ichinose et al. | |
| 4,270,665 A | 6/1981 | Kunimoto et al. | |
| 4,279,344 A | 7/1981 | Holloway, Jr. | |
| 4,352,925 A | 10/1982 | Petke et al. | |
| 4,361,237 A | 11/1982 | Heiremans et al. | |
| 4,365,716 A | 12/1982 | Watt | |
| 4,367,312 A | 1/1983 | Bontinck et al. | |
| 4,370,190 A | 1/1983 | Ichinose et al. | |
| 4,382,513 A | 5/1983 | Schirmer et al. | |
| 4,395,446 A | 7/1983 | Kunimoto et al. | |
| 4,665,130 A | 5/1987 | Hwo | |
| 4,753,980 A * | 6/1988 | Deyrup | 524/369 |
| 4,765,999 A * | 8/1988 | Winter | 264/171.13 |
| 4,784,885 A | 11/1988 | Carespodi | |
| 4,806,398 A | 2/1989 | Martin, Jr. | |
| 4,808,484 A | 2/1989 | Yamada et al. | |
| 4,886,690 A | 12/1989 | Davis et al. | |
| 4,889,731 A | 12/1989 | Williams, Jr. | |
| 4,901,505 A | 2/1990 | Williams, Jr. | |
| 4,937,139 A | 6/1990 | Genske et al. | |
| 4,956,212 A | 9/1990 | Bekele | |
| 4,961,513 A | 10/1990 | Gossedge et al. | |
| 5,023,121 A | 6/1991 | Pockat et al. | |
| 5,034,074 A | 7/1991 | Thomas, Jr. | |
| 5,062,569 A | 11/1991 | Hekal | |
| 5,160,767 A | 11/1992 | Genske et al. | |
| 5,175,035 A | 12/1992 | Pinsolle et al. | |
| 5,283,127 A | 2/1994 | Blumenstein et al. | |
| 5,334,643 A | 8/1994 | Gage | |
| 5,346,735 A | 9/1994 | Logan et al. | |
| 5,402,622 A | 4/1995 | Stockley, III et al. | |
| 5,445,838 A | 8/1995 | Lipinski et al. | |
| 5,459,186 A | 10/1995 | Gage | |
| 5,459,978 A | 10/1995 | Weiss et al. | |
| 5,470,156 A | 11/1995 | May | |
| 5,474,382 A | 12/1995 | May | |
| 5,478,617 A | 12/1995 | Watanabe et al. | |
| 5,489,252 A | 2/1996 | May | |
| 5,492,411 A | 2/1996 | May | |
| 5,500,265 A | 3/1996 | Ambroise et al. | |
| 5,509,735 A | 4/1996 | May | |
| 5,533,622 A | 7/1996 | Stockley, III et al. | |
| 5,545,420 A | 8/1996 | Lipinski et al. | |
| 5,565,250 A | 10/1996 | Ohlsson et al. | |
| 5,604,000 A | 2/1997 | May | |
| 5,620,802 A | 4/1997 | Arsac et al. | |
| 5,626,929 A | 5/1997 | Stevenson | |
| 5,629,060 A | 5/1997 | Garwood | |
| 5,643,991 A * | 7/1997 | Stipe et al. | 524/496 |
| 5,652,306 A * | 7/1997 | Meyer et al. | 524/504 |
| 5,677,069 A | 10/1997 | Seppanen et al. | |
| 5,854,346 A * | 12/1998 | Meyer et al. | 4/665 |
| 5,981,661 A * | 11/1999 | Liao et al. | 523/436 |

OTHER PUBLICATIONS

Research Disclosure No. 36825, Dec., 1994, p. 678, "Copolyester Blends for Use in Peelable Seal Applications".

* cited by examiner

Primary Examiner—Vivian Chen
(74) Attorney, Agent, or Firm—B. J. Boshears; Bernie Graves

(57) ABSTRACT

A heat sealable packaging film producing a peelable seal is formed from a blend of 99 to 75 weight percent of a copolyester and 1 to 25 weight percent of an epoxy-containing impact modifying polymer. The copolyester has a diacid component of at least 50 mole percent terephthalic acid, naphthalenedicarboxylic acid, 1,4-cyclohexanedicarboxylic acid, or mixtures thereof and diol component of about 90 to 35 mole percent ethylene glycol and 10 to 65 mole percent of at least one of diethylene glycol or 1,4-cyclohexanedimethanol.

13 Claims, No Drawings

POLYESTER PACKAGING FILMS PRODUCING A PEELABLE SEAL

CROSS-REFERENCE TO RELATED APPLICATIONS

This application is a divisional of application Ser. No. 09/243,317 filed Feb. 2, 1999, abandoned.

TECHNICAL FIELD

This invention relates to a heat sealable polyester packaging film producing a peelable seal when heat sealed to itself and other polyester materials, and more particularly this invention relates to multi-layer packaging structures having at least one layer of the film of the invention.

BACKGROUND OF THE INVENTION

Polyesters are commonly used in the packaging of a wide range of foods, beverages, industrial articles, medicinal products and the like. For example, poly (ethylene terephthalate) (PET) polyesters are used in the form of bottles, film, sheeting, thermoformed articles and the like for various packaging applications.

In many of these types of applications, consumers desire to have a readily peelable seal to enable easy access to the contents of a package. Peelable seals are those that have a mechanical strength which is, at the same time, sufficiently high to keep the package intact until it has to be opened by the consumer and sufficiently low to enable manual opening of the package without the use of any auxiliary instrument.

In the forming of peelable seals during the enclosure of an article in a package, manufacturers prefer a packaging material that is readily heat sealable to itself or another surface without the use of adhesives. Additionally, packaging materials capable of low temperature sealing are desirous to prevent damage of the articles or the packaging material itself.

Polyesters, while known to be heat sealable, are not capable of producing peelable seals. For films made of amorphous PET and PET copolyesters containing 1,4-cyclohexanedimethanol (CHDM), destructive film tear occurs when attempts are made to pull apart the seal. This type of bond failure is unacceptable for many packaging applications. Heat sealing of amorphous PET film to itself frequently causes crystallization of the PET. This leads to brittle bonds which are not useful for most packaging applications. Crystallized PET films, while heat sealable, are susceptible to having many processing difficulties and must be heat sealed at undesirably high temperatures in excess of 260° C. Again destructive tearing is observed when these sealed films are pulled apart.

Thus, there exists a need in the art for polyester packaging films which are easily heat sealed at relatively low temperatures to produce peelable seals without destructive bond failure. Accordingly, it is to the provision of such that the present invention is primarily directed.

BRIEF SUMMARY OF THE INVENTION

The present invention is a heat sealable packaging film, which produces a peelable seal. The film is formed from a blend of 99 to 75 weight percent of a copolyester and 1 to 25 weight percent of an epoxy-containing impact modifying polymer or a maleic anhydride-containing polymer.

The copolyester comprises diacid residues of at least 50 mole percent terephthalic acid, naphthalenedicarboxylic acid, 1,4-cyclohexane-dicarboxylic acid, or mixtures thereof and diol residues of about 90 to 35 mole percent ethylene glycol and 10 to 65 mole percent of at least one of diethylene glycol or 1,4-cyclohexanedimethanol. The diacid residues and the diol residues are each based on 100 mole percent.

The impact modifying polymer comprises about 0.5 to 20 weight percent of epoxy-containing monomers selected from glycidyl methacrylate, glycidyl acrylate, allyl glycidyl ether, 3,4-epoxy-1-butene, or a mixture thereof of any two or more monomers.

The maleic anhydride-containing polymer is selected from (i) a copolymer comprising about 80 to about 99 weight percent ethylene and about 1 to about 20 weight percent maleic anhydride, (ii) a grafted copolymer comprising about 1 to about 20 weight percent maleic anhydride and about 80 to about 99 weight percent olefin polymers, or (iii) a terpolymer comprising about 50 to about 98 weight percent ethylene, about 1 to about 20 weight percent maleic anhydride, and about 1 to about 30 weight percent alkyl acrylate.

DETAILED DESCRIPTION

Heat sealable packaging films that form a peelable seal can be made from a blend of (A) certain copolyesters and (B) epoxy-containing impact modifying polymers or maleic anhydride-containing polymers. Upon extrusion, the blends provide clear films and sheeting that are readily heat sealed to provide peelable bonds.

Heat sealing is conducted in a temperature range of about 85 to about 200° C. The preferred heat sealing range is about 100 to about 150° C. Sealing dwell times of about 0.5 to about 7 seconds are suitable. The heat sealable packaging film may be bonded to itself or to other polyester film or sheeting using conventional heat sealing methods. Other methods of heating the packaging film to an appropriate bonding temperature may also be used such as impulse heating, induction heating, infrared heating, radio frequency heating and the like.

The copolyester is present in the blend from about 99 to about 75 weight percent, based on the total weight of the components A and B. The copolyester comprises diacid residues of at least about 50 mole percent, preferably 80 mole percent, terephthalic acid, naphthalenedicarboxylic acid, 1,4-cyclohexanedicarboxylic acid or mixtures thereof. The copolyester comprises diol residues of about 90 to about 35 mole percent ethylene glycol and about 10 to about 65 mole percent of at least one of diethylene glycol or 1,4-cyclohexanedimethanol. The diacid residues and the diol residues are each based on 100 mole percent.

Mixtures of two or more dibasic acids and two or more glycols may be used if desired. Modifying amounts of dibasic acids containing from about four to about forty carbon atoms may be used including succinic, azelaic, adipic, sebacic, suberic, isophthalic, sulfoisophthalic, dimer and the like. Modifying amounts of glycols containing three to about ten carbon atoms may be used including propylene glycol, diethylene glycol, 1,4-butanediol, 1,6-hexanediol, neopentyl glycol, 1,4-cyclohexane-dimethanol, 1,3-propanediol and the like.

The copolyesters are commercially available and/or may be prepared by batch or continuous processes using conventional melt phase or solid state condensation procedures well known in the art. Also, the polyester component may be obtained from post consumer waste, e.g., recycled polyester.

In preparing the copolyesters, the dibasic acid moiety may be derived from the acid, the acid chloride, or the lower alkyl esters. Any of the various isomers or mixtures of isomers of naphthalenedicarboxylic acid may be used but the 1,4-, 1,5-, 2,6-, and 2,7-isomers are preferred. Also cis, trans, or cis/trans mixtures of 1,4-cyclohexanedimethanol or of 1,4-cyclohexanedicarboxylic acid may be used.

The copolyesters of this invention will generally have inherent viscosity (I.V.) values in the range of about 0.4 to about 1.5, preferably 0.5 to about 1.0. I.V. is measured at 25° C. by dissolving 0.5 grams of polyester into 100 mL of a solvent mixture consisting of 60 percent by weight phenol and 40 percent by weight tetrachloroethane.

Typical additives for polyesters may be used if desired. Such additives include stabilizers, antioxidants, colorants, pigments, mold release agents, slip agents, carbon black, flame retardants and the like.

The epoxy-containing impact modifying polymers or maleic anhydride-containing polymers are present in the blend from about 1 to about 25 weight %, preferably about 2 to about 10 weight %, based on the total weight of the components A and B.

The impact modifying polymers are comprised of about 0.5 to 20 weight percent of epoxy-containing monomers selected from glycidyl methacrylate, glycidyl acrylate, allyl glycidyl ether, 3,4-epoxy-1-butene, or a mixture of any two or more of such monomers. The impact modifying polymers may be prepared either by copolymerization or grafting.

In the former preparation, the epoxy-containing monomers above are copolymerized with other monomers such as ethylene and, optionally alkyl acrylates. Such epoxy-containing impact modifying polymers are well known in the art and are available from a plurality of manufacturers.

In the latter preparation, glycidyl methacrylate or glycidyl acrylate are grafted to form useful impact modifying polymers with polymers such as polyethylene; polypropylene; polybutene; ethylene based copolymers and terpolymers containing vinyl acetate, alkyl acrylate, alkyl methacrylate where the alkyl group could be methyl, ethyl, butyl or 2-ethylhexyl; ethylene-propylene copolymers (EPR); ethylene-propylene-diene terpolymers (EPDM); natural rubber; polybutadiene; polyisoprene; acrylonitrile-butadiene (nitrile rubber); styrene-butadiene (SBR); styrene-butadiene-styrene (SBS); styrene-ethylene-butene-styrene (SEBS); acrylonitrile-butadiene-styrene (ABS); methyl methacrylate-butadiene-styrene (MBS core-shell); organic silicone rubbers; elastomeric fluorohydrocarbons; elastomeric polyesters; polyurethanes; or combinations thereof. Of these materials, those based on polyethylene are preferred.

Preferred epoxy-containing impact modifying polymers comprise copolymers and terpolymers having the respective general formulas E/Y and E/X/Y wherein:

X represents residues derived from:

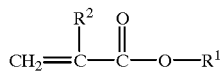

wherein $R^1$ is alkyl of up to about 8 carbon atoms, preferably alkyl of 1 to 4 carbon atoms, and $R^2$ is hydrogen, methyl or ethyl, preferably hydrogen or methyl, and X constitutes about 1 to 40 weight percent, preferably 1 to weight percent, and most preferably 5 to 26 weight percent, of terpolymer E/X/Y;

Y represents residues derived from glycidyl methacrylate (GMA), glycidyl acrylate, allyl glycidyl ether, or 3,4-epoxy-1-butene which constitute about 0.5 to 20 weight percent, preferably about 0.5 to 10 weight percent, of copolymer E/Y or terpolymer E/X/Y; and E represents ethylene residues, which constitute the remainder of copolymer E/Y, and terpolymer E/X/Y. Of these, copolymers based on ethylene-GMA (E/GMA) containing about 0.5 to 10 weight percent GMA residues are preferred and those containing about 1 to about 8 weight % are more preferred. The ethylene terpolymers preferably contain about 1 to about 30 weight % alkyl acrylate (such as methyl acrylate, ethyl acrylate, or butyl acrylate) and about 1 to about 10 weight % glycidyl methacrylate.

The maleic anhydride-containing polymers are copolymers comprising about 80 to about 99 weight percent ethylene and about 1 to about 20 weight percent. Preferably, ethylene is present at about 90 to about 99 weight percent and maleic anhydride is present at about 1 to about 10 weight percent. These polymers may also be terpolymers comprising about 50 to about 98 weight percent, preferably about 80 to about 98 weight percent, ethylene; about 1 to about 20 weight percent, preferably about 1 to about 10 weight percent, maleic anhydride; and about 1 to about 30 weight percent, preferably about 1 to about 10 weight percent, alkyl acrylate having the formula:

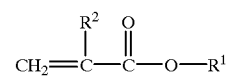

wherein $R^1$ is alkyl of up to about 8 carbon atoms and $R^2$ is hydrogen, methyl or ethyl.

Additionally, the maleic anhydride-containing polymers are a grafted copolymer obtained by grafting maleic anhydride to olefin homo- or copolymers. The grafted maleic anhydride is present in an amount of about 1 to about 20 weight percent, preferably about 1 to about 10 weight percent, and the olefin homo- or co-polymers are present in an amount of about 80 to 99 weight percent, preferably 90 to 99 weight percent. The olefin polymers may include polyethylene; polypropylene; polybutene; ethylene based copolymers and terpolymers containing vinyl acetate, alkyl acrylate, alkyl methacrylate where the alkyl group could be methyl, ethyl, butyl or 2-ethylhexyl; ethylene-propylene copolymers (EPR); ethylene-propylene-diene terpolymers (EPDM); natural rubber; polybutadiene; polyisoprene; acrylonitrile-butadiene (nitrile rubber); styrene-butadiene (SBR); styrene-butadiene-styrene (SBS); styrene-ethylene-butene-styrene (SEBS); acrylonitrile-butadiene-styrene (ABS); methyl methacrylate-butadiene-styrene (MBS core-shell); or combinations thereof. Of these materials, those based on polyethylene are preferred. Other useful polymers for grafting maleic anhydride may include organic silicone rubbers; elastomeric fluorohydrocarbons; elastomeric polyesters; and polyurethanes.

The ethylene based polymers of the present invention preferably have melt flow index values ranging from about 0 to about 30 g/10 minutes when measured at 190° C. with 2.16 kg weight according to ASTM D1238. However, those with melt index values ranging from about 1 to about 20 g/10 minutes are preferred.

Pellet blends of the (A) copolyester and (B) either the epoxy-containing impact modifying polymers or maleic anhydride-containing polymers may be extruded into film and sheeting for the purposes of this invention. The two polymers may be melt blended and pelletized as a blend prior to the extrusion process or they may be fed from separate streams into the extrusion process. The melt blending may be conducted using conventional compounding technology, such as the use of single or twin-screw extruders. Concentrate blends may also be used with the concentrate blends being let down to desired levels during the subsequent extrusion or coextrusion steps.

The heat sealable packaging films of this invention may be in the form of monolayer or multilayer structures. To form multilayer structures, the polyester blend of the present invention and another polymer such as PET are coextruded using techniques well known in the art. In such multilayer structures the blend layer will have a thickness in the range of about 0.1 mils (0.0025 mm) to about 10 mils (0.25 mm), while the PET layer will be about 0.5 mils (0.0125 mm) to about 40 mils (1.0 mm). Preferred laminates will have an overall thickness of about 5 (0.125 mm) to about 20 mils (0.5 mm). Recycled PET may be used in the multilayer structures if desired. In addition to the coextrusion process, the polyester blend layer may be laminated to an unmodified PET film or sheeting, PVC, or polyolefins such as polyethylene and polypropylene with in-line or off-line lamination techniques well known in the art. The polyester blend may also be extrusion coated onto a preformed polymeric film or sheeting.

The monolayer and multilayer structures of this invention are useful for a wide range of packaging applications in the form of films or sheets. For example, they may be used to package foods such as cheeses, meats, and fruits; industrial articles such as screw drivers, pliers, saw blades, pencils, pens, and gauges; detergents; soaps; personal care products such as hand lotions, cosmetics, and perfumes; as well as medicinal products.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

A melt blend is prepared in a Werner and Pfleiderer 30 mm twin screw extruder consisting of 95 weight percent of a PET copolyester containing 31 mole percent 1,4-cyclohexanedimethanol (I.V. 0.76) and 5 weight percent (wt %) of a random ethylene/methyl acrylate/glycidyl methacrylate terpolymer at 69.25 wt %, 23.5 wt %, and 7.25 wt %, respectively (Lotader AX8900 available from Elf Atochem Co.); melt index 6.5 g/10 min.). The compounded product is extruded through a Killion 1.25 inch (3.18 cm) single screw extruder with set temperatures on the extruder barrel and adapter of 500° F. (260° C.). Simultaneously, a PET copolyester containing 3.5 mole % 1,4-cyclohexanedimethanol (I.V 0.76) is extruded through a 2 inch (5.08 cm), 24/1 UD Davis Standard extruder with set temperatures on the barrel of 540° F. (282° C.) and gate, neck, and die temperatures set at 520° F. (271° C). The materials meet and pass through a Production Components B-A-C three layer feedblock followed by an Ultra Flex coathanger die having a 75 mil (1.9 mm) die lip opening and 1 inch (2.54 cm) land length to provide an 18 mil (0.45 mm) thick laminate. The PET copolyester/Lotader AX8900 blend layer is 3 mil (0.075 mm) thick. The laminate is clear and has a polished surface.

Samples of this laminate are heat sealed at 120° C. using a 5 second dwell time in a TMI Supersealer (Model number 75-10, Testing Machines Inc.). The heat sealed samples are pealed apart using ASTM D1876 (T-Peel Strength Test of Adhesive Bonds). The T-peel strength is 3.82 N/15 cm and the mode of failure is adhesive.

Samples of this laminate are also used to package screwdrivers. The heat seals are made as described above. The heat-sealed package is readily peeled apart to remove the screwdriver.

Peelable bonds are also readily prepared at 140° C. with a 2-second dwell time.

Similarly, good results are achieved when 5 wt % of an ethylene/n-butyl acrylate/maleic anhydride terpolymer (79.2/17.7/3.1 wt %, respectively) having a melt index of 19 g/10 min is used instead of the Lotader AX8900.

EXAMPLE 2 (COMPARATIVE)

Using the procedure of Example 1, an 18 mil (0.45 mm) laminate is prepared using 5 wt % of a styrene-butadiene-styrene tri-block polymer (Kraton FG1901X available from Shell Chemical Co.) instead of the Lotader AX8900. The PET copolyester/Kraton blend layer is 3 mils (0.075 mm) thick.

This laminate is heat sealed at 120° C. with a 5-second dwell time. The bonds are so weak that this laminate is not useful for packaging purposes.

Similarly poor bonds are also obtained when 5 wt % of a random ethylene/methyl acrylate copolymer (Lotryl 24MA07) is used in the copolyester blend layer.

EXAMPLE 3

The procedure of Example 1 is repeated using a PET copolyester containing 60 mole percent 1,4-cyclohexanedimethanol (I.V. 0.75) and 2.5 wt % of Lotader AX8900. The other component of the laminate is unmodified PET (I.V. 0.74). The overall thickness of this laminate is 20 mils (0.508 mm) and the heat seal layer is 2 mil (0.05 mm) thick. This laminate is used to package small bottles of hand lotion and the heat seal is made at 120° C. with 7-second dwell time). The package is readily peeled apart to remove the hand lotion.

Similarly good results are obtained when Lotader AX8920, a terpolymer of 73 wt % ethylene/26 wt % methyl acrylate/1 wt % glycidyl methacrylate (melt index 4 g/10 minutes) is used instead of the Lotader AX8900 in the heat seal layer.

Similarly good results are also obtained when the heat seal layer is based on a PET copolyester containing 37 mole percent diethylene glycol (I.V. 0.72) or on a PET copolyester containing 10 mole percent 2,6-naphthalenedicarboxylic acid and 25 mole percent 1,4-cyclohexane-dimethanol (I.V. 0.68).

The invention has been described in detail with particular reference to preferred embodiments thereof, but it will be understood that variations and modifications can be effected within the spirit and scope of the invention.

We claim:

1. A heat sealable packaging film producing a peelable seal formed from a blend, the blend comprising:
    (A) about 99 to about 75 weight percent of a copolyester comprising:
       i. diacid residues of at least about 50 mole percent terephthalic acid, naphthalenedicarboxylic acid, 1,4-cyclohexanedicarboxylic acid, or mixtures thereof; and
       ii. diol residues of about 90 to about 35 mole percent ethylene glycol and about 10 to about 65 mole percent of at least one of diethylene glycol or 1,4-cyclohexanedimethanol; and
    (B) about 1 to about 25 weight percent of an impact modifying polymer selected from copolymers and terpolymers having the respective general formulas E/Y and E/X/Y wherein:

X represents residues derived from

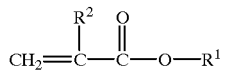

wherein $R^1$ is alkyl of up to about 8 carbon atoms and $R^2$ is hydrogen, methyl, or ethyl, and X constitutes about 1 to about 30 weight percent of terpolymer E/X/Y;

Y represents residues derived from glycidyl methacrylate, glycidyl acrylate, allyl glycidyl ether or 3,4-epoxy-1-butene, and Y constitutes about 0.5 to about 10 weight percent of copolymer E/Y and terpolymer E/X/Y; and E represents ethylene residues that constitute the remainder of the copolymer or terpolymer;

wherein copolyester component A is based on 100 mole percent diacid residues and 100 mole percent diol residues and the weight percentages are based on the total weight of components A and B.

2. The film of claim 1 wherein the impact modifying polymer is a copolymer comprising about 99.5 to about 90 weight percent ethylene and about 0.5 to about 10 weight percent glycidyl methacrylate or a terpolymer comprising about 98 to about 60 weight percent ethylene, about 1 to about 30 weight percent alkyl acrylate, and about 1 to about 10 weight percent glycidyl methacrylate.

3. The film of claim 1 wherein component A, the diacid residues comprise at least 80 mole percent terephthalic acid, naphthalene-dicarboxylic acid, 1,4-cyclohexanedicarboxylic acid, or mixtures thereof.

4. The film of claim 1 wherein said film is heat sealable to a surface at temperatures from about 85 to about 200° C.

5. The film of claim 1 wherein said film is heat sealable to a surface at temperatures from about 100 to about 150° C.

6. The film of claim 1 wherein said film is heat sealable to itself and polyesters.

7. The film of claim 1 wherein component B is present in an amount of about 2 to about 10 weight percent.

8. The film of claim 1 wherein the ethylene copolymers and terpolymers have a melt index of about 1 to about 20 grams per 10 minutes measured at 190° C. with 2.16 kilogram weight according to ASTM D1238.

9. A multi-layer packaging structure comprising at least two dissimilar films, at least one of the external surfaces of the structure being made from a first film comprising the heat sealable packaging film of claim 1.

10. The packaging structure of claim 9 wherein the first film has a thickness from about 0.1 mil (0.0025 mm) to about 10 mils (0.25 mm).

11. The packaging structure of claim 10 wherein the first film has a thickness from about 0.1 mil (0.0025 mm) to about 10 mils (0.25 mm) and the second film has a thickness of about 0.5 mil (0.0125 mm) to about 40 mils (1.0 mm).

12. The packaging structure of claim 9 having a total thickness of about 5 mils (0.125 mm) to about 20 mils (0.5 mm).

13. The packaging structure of claim 9 wherein a second film is selected from polyesters, polyvinyl chloride, and polyolefins.

* * * * *